United States Patent
Rader et al.

(10) Patent No.: US 7,808,220 B2
(45) Date of Patent: Oct. 5, 2010

(54) METHOD AND APPARATUS FOR A CHARGE PUMP DC-TO-DC CONVERTER HAVING PARALLEL OPERATING MODES

(75) Inventors: Bill Rader, Carrboro, NC (US); David P. Keesor, Chapel Hill, NC (US); Calbert Lee Perkins, Cary, NC (US)

(73) Assignee: Semtech Corporation, Morrisville, NC (US)

( * ) Notice: Subject to any disclaimer, the term of this patent is extended or adjusted under 35 U.S.C. 154(b) by 614 days.

(21) Appl. No.: 11/776,201

(22) Filed: Jul. 11, 2007

(65) Prior Publication Data
US 2009/0016085 A1 Jan. 15, 2009

(51) Int. Cl.
G05F 1/59 (2006.01)
(52) U.S. Cl. ..................................... 323/268
(58) Field of Classification Search ................. 323/268, 323/273, 274, 279, 282, 284, 303, 351
See application file for complete search history.

(56) References Cited

U.S. PATENT DOCUMENTS

| | | | |
|---|---|---|---|
| 6,262,567 B1 * | 7/2001 | Bartlett | 323/303 |
| 6,597,158 B2 * | 7/2003 | Umeda | 323/268 |
| 6,903,535 B2 * | 6/2005 | Liu et al. | 323/222 |
| 6,903,538 B2 * | 6/2005 | Umeda et al. | 323/268 |
| 6,956,304 B2 * | 10/2005 | Brox | 307/87 |
| 7,009,858 B2 * | 3/2006 | Umeda et al. | 363/65 |
| 7,550,954 B2 * | 6/2009 | De Nisi et al. | 323/266 |
| 2009/0237046 A1 * | 9/2009 | Hsieh et al. | 323/273 |

* cited by examiner

Primary Examiner—Adolf Berhane
(74) Attorney, Agent, or Firm—Coats & Bennett, P.L.L.C.

(57) ABSTRACT

According to one or more aspects of DC-to-DC voltage conversion as taught herein, a DC-to-DC converter selectively operates in a first mode wherein an included linear pass output circuit supplies the output power from the DC-to-DC converter, in a second mode wherein an included charge pump output circuit supplies the output power, and in a third mode wherein the linear pass and charge pump output circuits operate in parallel to supply the output power. With this third mode, also referred to as a "dual" mode, wherein the linear pass and charge pump output circuits operate in parallel, the DC-to-DC converter keeps the more efficient output circuit on after it has begun switching to operation with the less efficient output circuit. Such switchover may be performed dynamically in response to changing operating conditions. Detected operating conditions may include input voltages, output voltages, and output load conditions.

20 Claims, 6 Drawing Sheets

METHOD AND APPARATUS FOR A CHARGE PUMP DC-TO-DC CONVERTER HAVING PARALLEL OPERATING MODES

BACKGROUND

1. Technical Field

The present invention generally relates to power conversion, and particularly relates to charge pump DC-to-DC converters that provide parallel modes of operation.

2. Background

Charge pumps include switching circuitry that use capacitors to store and transfer energy to an output. Charge pumps frequently include regulation control loops to maintain their output voltages at a desired voltage (or range of voltages.) Different charge pump configurations allow various modes of buck (step-down) and boost operation.

Modal DC-to-DC converters may be constructed using different charge pump output circuits, or different configurations of such circuits. For example, so-called fractional mode DC-to-DC converters typically offer a "1×" mode of operation wherein the converter regulates a linear pass output circuit to supply output power from the converter at a desired output voltage, and at least one "non-1×" mode wherein the converter regulates a charge pump output circuit to supply output power from the converter at a desired output voltage. The converter generally is programmed or otherwise configured to switch between the 1× and non-1× modes of operation responsive to changing operating conditions. For boost-mode charge pump circuits, typical non-1× modes may be any one or more of 1.5× and 2× modes, while typical non-1× modes for buck-mode charge pump circuits may be any one or more of ½×, ⅔×, and ¾× modes.

Generally, one of the available modes will be more efficient than the others, for given operating conditions. As a working example, a given DC-to-DC converter may be configured to maintain the same desired output voltage over a varying range of input voltages, e.g., a changing battery voltage. For one range of battery voltages, it may be more efficient (or required, given the input/output voltages involved) for the converter to operate in the 1× mode, while for another range of battery voltages, it may be more efficient (or required) for the converter to operate in a non-1× mode.

A significant difficulty in realizing a working modal DC-to-DC converter in actual circuitry is that the output voltage from the DC-to-DC converter generally cannot reach the ideal input/output ratio for a given charge pump configuration due to the series resistance and parasitic capacitance of the transistor switches and the capacitors used to implement the charge pump output circuit. Consequently, the maximum output voltage to input voltage ratio that can be delivered by the converter will decrease as the output load current increases. A first order parameter for calculating how much the output voltage will drop is the effective output resistance of the charge pump output circuit. For example, if the output voltage is 1V below its ideal input/output ratio when delivering 1 A of output current, then the active output circuit of the DC-to-DC converter has an output resistance of 1V/1 A=1 Ohm under those conditions.

This effective output resistance presents several design challenges, including efficiency loss and difficulty in making the decision as to when to switch between modes of the DC-to-DC converter. The efficiency losses arise because, at higher output current loads, the output voltage drop incurred because of the effective output resistance means that the DC-to-DC converter needs to switch to a less efficient configuration at higher input voltages in order to reliably deliver the rated output voltage. Moreover, once the DC-to-DC converter has switched to the less efficient mode, it generally has no direct way to tell if it will be able to switch back to the more efficient mode and reliably deliver all required output power. Therefore, the switchover return decision is typically made by estimating the series resistance of the transistor switches and capacitors, then adding some margin onto the calculated result before deciding to switch back to the more efficient mode.

Such margin-based decision logic causes the DC-to-DC converter to remain in the less efficient mode longer than may be actually necessary. Of course, switching to a more efficient mode at an input voltage that is not high enough to deliver the needed output current at the rated voltage is bad, too, because it may cause the DC-to-DC converter to ping-pong between modes, where it rapidly switches back and forth between operating modes, because each time that it switches to the more efficient mode the output voltage drops, causing transition back to the less efficient mode.

The above challenges encourage conservative switchover control. For example, designers may design a given DC-to-DC converter to remain in one mode longer than optimal efficiency would dictate, to allow for switchover detection threshold errors, ping-pong avoidance, etc. In other words, given the potential problems associated with prematurely switching from one mode to another, and with switching under dynamic load current conditions, the tendency is to use more conservative values (e.g., voltage and/or current thresholds) to trigger mode switchover. Efficiency consequently suffers because the DC-to-DC converter may defer switching into a more efficient operating mode until worst-case detection values are satisfied.

SUMMARY

According to one or more aspects of DC-to-DC voltage conversion as taught herein, a method of operating a DC-to-DC converter that includes a linear pass output circuit and a charge pump output circuit comprises dynamically selecting a first, second, or third mode of operation for the DC-to-DC converter. In the first mode of operation, the DC-to-DC converter supplies output power (to a load) via the linear pass output circuit, while in the second mode of operation the DC-to-DC converter supplies the output power via the charge pump output circuit. In the third mode of operation, it supplies the output power via the linear pass and the charge pump circuits operating in parallel. The third mode of operation allows the more efficient one of the two output circuits to continue operation and provide at least a portion of the load current.

The third mode of operation, also referred to as "dual" mode operation, as taught herein offers a number of advantages, including greater overall converter efficiency and improved regulation performance, e.g., improved noise immunity, transient response, etc., over changing operating conditions. For example, for given circuit configurations of the linear pass and charge pump output circuits, one such circuit is considered to be the "stronger" (but less efficient) one, and the other output circuit is considered to be the "weaker" (but more efficient) one. In this context, the output circuit having the higher input-to-output voltage multiple is the stronger one; thus, a 1.5× charge pump circuit is defined as being stronger than a 1× linear pass circuit, while a 1× linear pass circuit is defined as being stronger than a ¾× charge pump circuit.

With that in mind, in one or more embodiments taught herein, a control circuit in a DC-to-DC converter is configured to operate in the third mode under conditions that permit such operation. In at least one such embodiment, third mode operation is based on operating the stronger one of the two output circuits with voltage regulation, and operating the weaker one of the two output circuits in parallel with the stronger one, but without voltage regulation. Doing so eliminates the need to add another voltage regulation loop for dual mode operation.

In one embodiment, the control circuit is configured to exit dual mode operation if it detects that continued dual mode operation is interfering with the ability to maintain regulation of the converter's output voltage. For example, the converter may detect that input voltage has fallen too low for the weaker output circuit to operate, or, as another non-limiting example, the converter may detect that operation of the weaker output circuit as an unregulated supply is driving the converter's output voltage too high.

More generally, in one or more embodiments, mode selection is based on monitoring or otherwise detecting one or more operating conditions bearing on the ability of one or both of the converter's output circuits to provide the needed load current at the desired output voltage over a range of operating conditions. In at least one embodiment, mode selection is, for given output load conditions, driven by directly or indirectly sensing changing input voltages applied to the DC-to-DC converter.

Thus, in one or more embodiments taught herein, a DC-to-DC converter includes a control circuit that selectively operates the converter in the first, second, and third modes based on, e.g., one or more detected operation conditions. In one or more such embodiments, the DC-to-DC converter is configured to run both output circuits in parallel until the more efficient one is able to deliver little or no power to the output. Keeping the more efficient output circuit enabled after the less efficient output circuit is enabled simplifies the mode switching logic and allows the more efficient output circuit to continue delivering as much current as it can at the given output voltage, with the less efficient configuration delivering the rest of the needed output current.

In at least one such embodiment the control circuit operates a stronger one of the two output circuits with voltage regulation and operates the weaker one of the two output circuits without voltage regulation. Thus, in one or more embodiments, the control circuit exits the third mode of operation in response to detecting that operation in the third mode is interfering with regulation of the output voltage of the DC-to-DC converter. The control circuit also exits the third mode in response to detecting that, for given output load conditions, the input voltage is at or below a threshold that permits continued operation of the weaker output circuit.

Of course, the present invention is not limited to the above contexts, nor is it limited to the above features and advantages. Indeed, those skilled in the art will recognize additional features and advantages upon reading the following detailed description and upon viewing the accompanying drawings.

DETAILED DESCRIPTION

Figure 1:
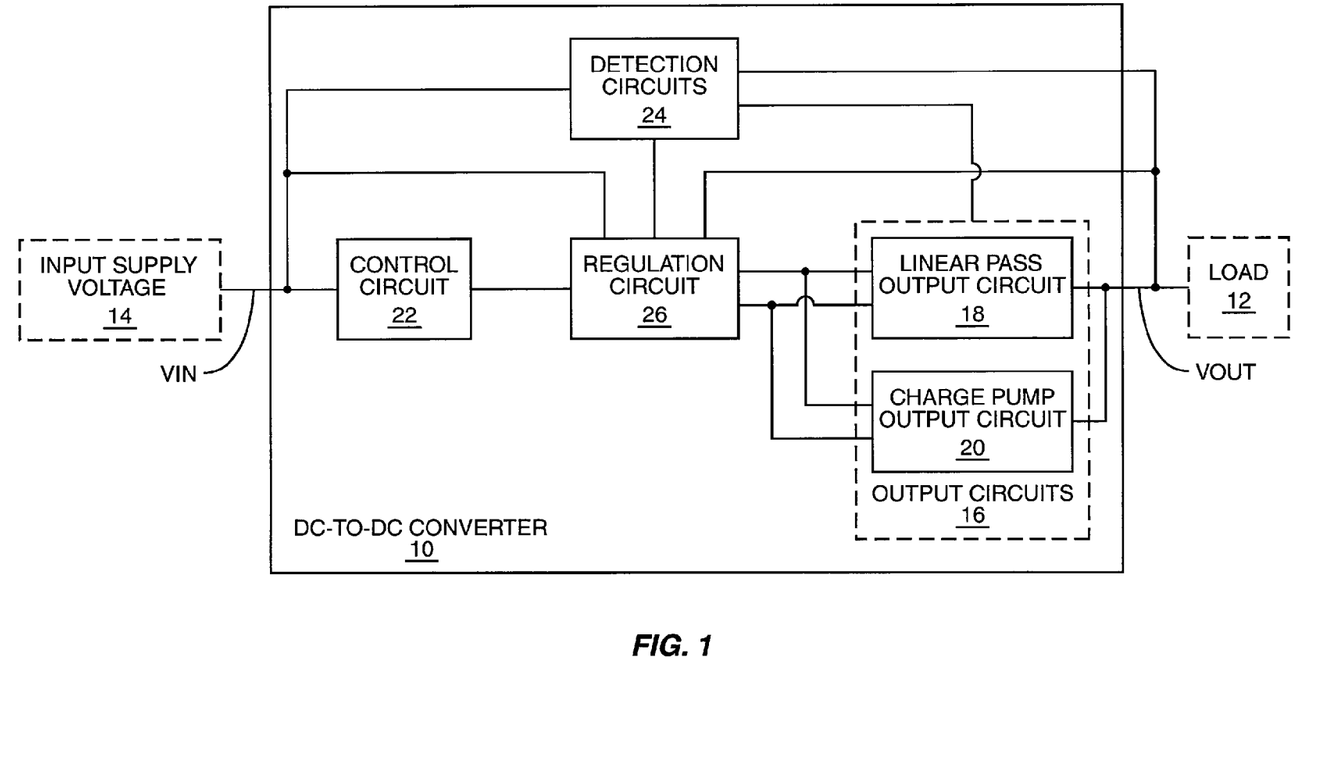
FIG. 1 is a block diagram of one embodiment of a dual-mode DC-to-DC converter as taught herein.

FIG. 1 illustrates one embodiment of a DC-to-DC converter 10 that supplies output power to a load 12 at a regulated output voltage (VOUT), based on receiving input power from a supply voltage 14 at an input voltage (VIN). The DC-to-DC converter ("converter 10") includes a number of output circuits 16, which are illustrated as including a linear pass output circuit 18 and charge pump output circuit 20. The converter also includes a control circuit 22, one or more detection circuits 24, and a regulation circuit 26.

Of particular interest herein, the control circuit 22 is configured to selectively operate the converter 10 in one of a first mode of operation wherein the converter 10 supplies output power (to the load 12) via the linear pass output circuit 18, a second mode of operation wherein the converter 10 supplies the output power via the charge pump output circuit 20, and a third mode of operation wherein the converter 10 supplies the output power via the linear pass and charge pump output circuits 18 and 20 operating in parallel.

The first and second modes of operation may be considered "single" modes of operation where a single, selected one of the two output circuits 18 and 20 is used to supply the output power from the DC-to-DC converter. With that frame of reference, then, the third mode of operation is regarded as a dual mode of operation because the linear pass and charge pump output circuits 18 and 20 operate in parallel to supply the output power. Advantageously, the dual mode of operation allows the most efficient one of those two output circuits to supply whatever amount of the needed output power it can, given the prevailing operating conditions (VIN, VOUT, load current, etc.).

To better understand this operation, one of the two output circuits 18 and 20 is "stronger" in terms of its input-to-output voltage ratio. For example, linear pass output circuit 18 is regarded as having a nominally one-to-one input-to-output voltage ratio, and is referred to as a "1× device." If the charge pump output circuit 20 is configured for boost mode operation, it will have a greater-than-one input-to-output voltage ratio, e.g., 1.5× or 2×, and thus would for purposes of this discussion be considered stronger but less efficient than the weaker linear pass output circuit 18. Conversely, if the charge pump output circuit 20 is configured for buck mode operation, it will have a less-than-one input-to-output voltage ratio, e.g., ¾×, and thus would be considered weaker but more efficient than the stronger linear pass output circuit 18.

With the modal teachings herein, then, the DC-to-DC converter 10 can be configured to supply all of the output power using the weaker but more efficient one of the output circuits 18 and 20, when conditions permit such operation. Then, when conditions do not permit such operation, it can switch to the dual mode, wherein the weaker output circuit 18 or 20 is operated in parallel with the stronger output circuit 20 or 18, thereby allowing the more efficient output circuit to continue operation when it can supply at least some of the output power.

In at least one embodiment, then, the control circuit 22 is configured to perform a method wherein it dynamically switches between the first, second, and third modes of operation based on one or more detected operating conditions. Such operation includes selecting the third mode of operation if the one or more detected operating conditions indicate that a more efficient one of the linear pass and charge pump output circuits 18 and 20 can supply some but not all of the output power from the DC-to-DC converter. Such operation also may include selecting one of the first and second modes that corresponds to the more efficient one of the linear pass and charge pump output circuits 18 and 20 if the detected operating conditions indicate that the more efficient one can supply all of the output power from the DC-to-DC converter. For example, if the linear pass circuit 18 is more efficient, and if detected operating conditions indicate that it can supply all of the output power, the control circuit 22 selects the first mode of operation.

Further, dynamically switching between the first, second, and third modes of operation based on one or more detected operating conditions in one or more embodiments includes selecting the first mode of operation if the detected operating conditions indicate that the charge pump output circuit 20 cannot supply any of the output power from the DC-to-DC converter, or selecting the second mode of operation if the detected operating conditions indicate that the linear pass output circuit 18 cannot supply any of the output power from the DC-to-DC converter. That is, if the linear pass circuit 18 is the more efficient output circuit but detected operating conditions indicate that it cannot supply any of the output power, the control circuit 22 selects operation in the second mode, wherein the charge pump output circuit 20 is used to supply the output power. Conversely, if the charge pump circuit 20 is the more efficient output circuit but detected operating conditions indicate that it cannot supply any of the output power, the control circuit 22 selects operation in the first mode, wherein the linear pass output circuit 18 is used to supply the output power.

Further, the control circuit 22 may be configured to, while in the third mode of operation, operate a stronger one of the linear pass and charge pump output circuits 18 and 20 as a regulated voltage source and operate the weaker one of the linear pass and charge pump output circuits 18 and 20 as an unregulated voltage source. Thus, at least one embodiment of the third or dual mode of operation comprises regulating the output voltage of one of the output circuits 18 and 20, while not regulating the output voltage of the other one. One advantage to this arrangement is that it eliminates the need to add another regulation loop to the converter 10 for dual mode operation.

In such embodiments, the control circuit 22 is configured to exit the third mode of operation responsive to detecting that operating the linear pass and charge pump output circuits in parallel is interfering with regulating an output voltage of the DC-to-DC converter. The control circuit 22 is also configured to exit the third mode in response to detecting that an input voltage of the DC-to-DC converter 10 is at or below a threshold that prevents one of the linear pass and charge pump output circuits 18 or 20 from continuing to supply any output power.

Figure 2:
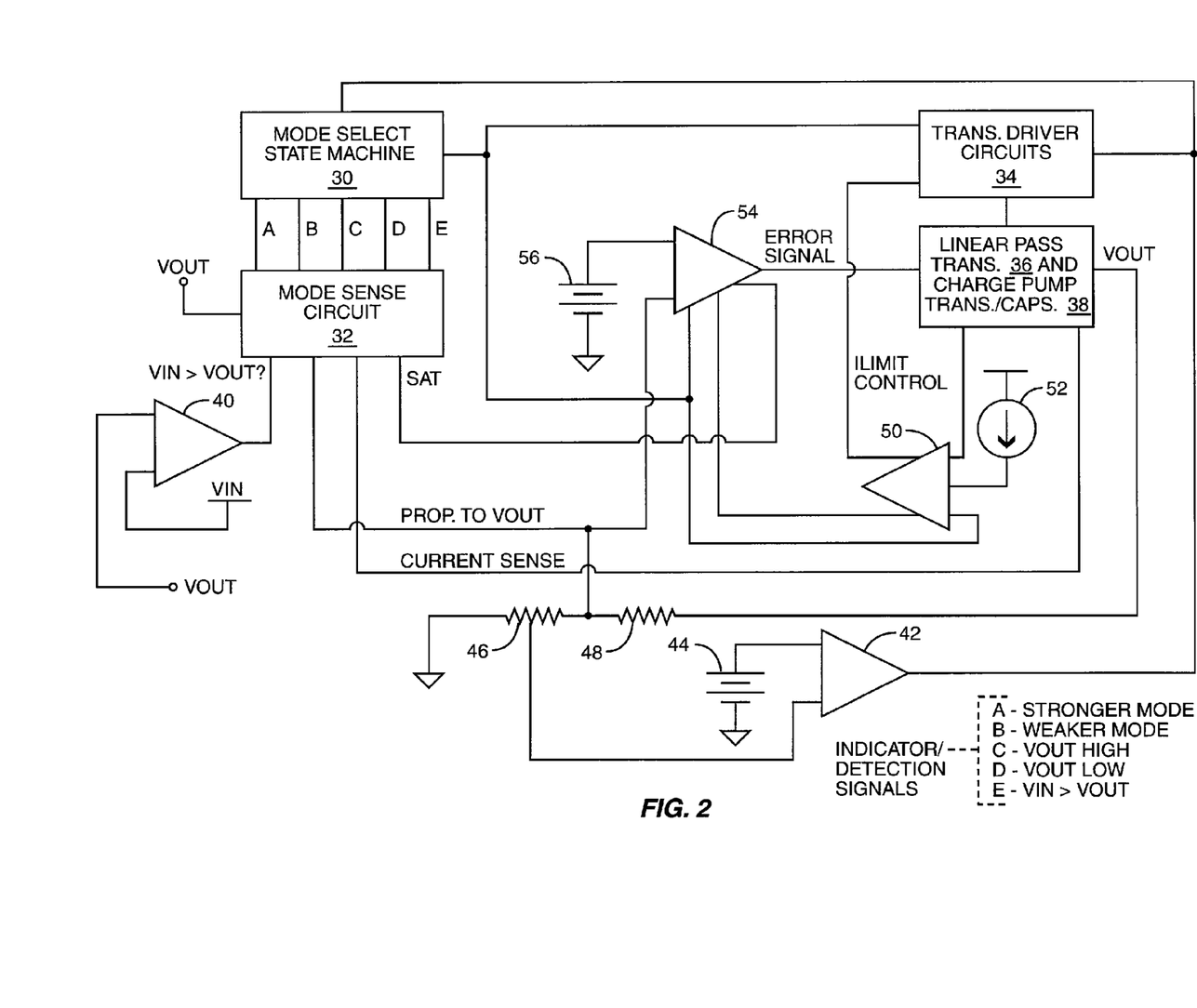
FIG. 2 is a schematic diagram that includes example circuit details for the DC-to-DC converter of FIG. 1.

As a non-limiting example of more control circuit details, and as an illustration of one advantageous implementation of the converter 10, FIG. 2 provides a number of schematic details. In FIG. 2, the control circuit 22 may be implemented via a mode select state machine 30 and a mode sense circuit 32. The output circuits 18 and 20 may be implemented via transistor driver circuits 34, a linear pass transistor 36, and charge pump transistors/switched capacitors 38. Continuing, the detection circuits 24 may be implemented via an input/output voltage comparator 40, an over/under comparator 42 for the DC-to-DC converter's output voltage VOUT having associated therewith a voltage reference 44 and (optionally) a voltage divider comprising variable resistor 46 and resistor 48. The detection circuits 24 also may include a current limit sense amplifier 50 having associated therewith a reference current source 52. Finally, the regulation circuit 26 may be implemented via an error amplifier 54 having associated therewith a reference voltage 56. The reference voltage 56 may be set as (or proportional to) the regulation target for VOUT, and may be programmable digitally or via an external resistor, etc.

Those skilled in the art will envision numerous other regulation methods for controlling a voltage (Vout), a current (Iout), or a combination of the two. For example, the teachings herein may be applied to an LED current regulation context, where LED current is regulated for illumination control, for example, but where mode switching is based on (input/output) voltages.

With these non-limiting circuit details in mind, the illustrated embodiment of the converter 10 generates VOUT in single-mode as a regulated voltage using a selected one of the linear pass transistor 36 and the charge pump transistors/switched capacitors 38. That is, for certain detected operating conditions (e.g., VIN, VOUT, and load current), the mode select state machine 30 operates the converter 10 in a single mode where the linear pass transistor 36 is operated as a regulated voltage source and provides the output power from the converter 10, i.e., the first mode described earlier herein. This mode may be referred to as a linear pass mode, and also may be referred to as a 1× mode. Both terms denote single-mode operation with just the linear pass output circuit 18 active in providing regulated output power from the converter 10. (Note that 1× mode does not necessarily connote a 1:1 input/output voltage ratio.) With such operation, the error signal from the error amplifier 54 provides regulation control of the linear pass transistor 36, allowing it to act as a variable resistor for output voltage regulation.

Conversely, for other detected operating conditions, the mode select state machine 30 operates the converter 10 in a single mode where the charge pump transistors/switched capacitors 38 are operated as a regulated voltage source and provide the output power from the converter 10, i.e., the second mode described earlier herein. This mode may be referred to as a "charge pump" mode, and also may be referred to as a non-1× mode. Both terms denote single-mode operation with just the charge pump output circuit 20 providing regulated output power from the converter 10. With such operation, the error signal from the error amplifier 54 provides regulation control of the transistors used in the transistors/switched capacitors 38, or for one or more separate transistors in the power path.

For still other detected operating conditions, the mode select state machine 30 operates the converter 10 in a dual mode where the linear pass transistor 36 and the charge pump transistors/switched capacitors 38 are operated in parallel, i.e., with both the linear pass output circuit 18 and the charge pump output circuit 20 operating in parallel, with each supplying a portion of the output power from the converter 10. With such operation, the error signal from the error amplifier 54 provides regulation control for a select one of the two output circuits 18 and 20. In at least one such embodiment, the stronger one of the output circuits 18 or 20 is operated as a regulated voltage source and the weaker one of the output circuits 18 or 20 is operated as an unregulated voltage source.

Of course, in such operation, the detection circuits 24, i.e., the over/under comparator 42, the Vin>Vout comparator 40, and/or saturation of the error amplifier 54, may be used to monitor the output voltage VOUT to determine whether parallel operation of the unregulated one of the two output circuits 18 and 20 is interfering with the ability to maintain VOUT within lower and upper voltage bounds. If dual mode operation is interfering with regulation of VOUT, the mode select state machine 30 causes the converter 10 to exit dual mode and enter single mode operation in one of the first and second modes, with a corresponding one of the two output circuits 18 and 20 active.

The "A," "B," "C," "D," and "E" labels in FIG. 2 correspond to one possible set of indicators/detection signals corresponding to monitored operating conditions, respectively including a "Stronger Mode" indicator, a "Weaker Mode" indicator, a "VOUT High" indicator, a "VOUT Low" indicator, and a "VIN>VOUT" indicator. These indicators as generated or otherwise conditioned via the mode sense circuit 32 to serve as state machine inputs for the mode select state machine 30, and thus drive state transitions associated with first/second/third mode control of the converter 10.

In more detail, as noted earlier, dual mode operation involves operating the converter's 1× output circuitry (e.g., the linear pass output circuit 18) in parallel with non-1× output circuitry (e.g., the charge pump output circuit 20). With such operation, the 1× and non-1× output circuits may "share" the load, with each one providing a portion of the load current. More particularly, the weaker but more efficient one of the output circuits 18 or 20 provides as much of the total load current as it can given input/output voltage conditions, with the stronger but less efficient one of the output circuits 18 or 20 providing the remaining output current. (Again, the stronger output circuit 18 or 20 is the higher-multiple one of those two circuits.)

During dual mode operation in this manner, the weaker output circuit 18 or 20 is operated without voltage regulation and the stronger output circuit 18 or 20 is operated with voltage regulation, where the output voltage regulation control loop is closed through the error amplifier 54. As such, the control state of the error amplifier 54 provides a basis for enhanced first/second/third mode selection control.

For example, one or more embodiments evaluate a "SAT" indicator during dual mode operation that indicates a saturation condition of the error amplifier 54. If the error amplifier 54 is fully off (a "saturated off" condition), that indicates that the weaker output circuit 18 or 20 can supply all of the load current and that the stronger output circuit 18 or 20 is not needed. A "Weaker Mode" indicator may be asserted or otherwise set by the mode sense circuit 32 to indicate this condition. On the other hand, if the error amplifier 54 is fully on (a "saturated on" condition), that indicates that the stronger output circuit 18 or 20 is driving as hard as it can to source load current at the desired output voltage. A "Stronger Mode" indicator may be asserted or otherwise set by the mode sense circuit 32 to indicate this condition.

According to the above framework, then, greater first/second/third mode selection control sophistication may be obtained by evaluating the Weaker and Stronger Mode indicators, along with the other indicator/detection signals related to input and output voltages.

Various ones of these voltage indicators include, in one or more embodiments, a VIN>VOUT indicator that indicates whether the input voltage is above the output voltage. That condition is a prerequisite for enabling the linear pass output circuit 18 in single or dual modes. Similarly, the VOUT Low and VOUT High indicators respectively indicate under voltage and over voltage conditions for the output voltage, and may be used, for example, as triggers for exiting dual mode operation. Further, the CURRENT SENSE signal from the transistors/switched capacitors 38 may be used to sense the load current, IOUT. For example, the output transistors included in the circuit 38 may include sense cells which provide a signal proportional to output current. Note that this current sensing is different from the limit sensing provided by amplifier 50/reference 52. Those two elements cooperate to provide over-current sensing for IOUT, which is needed, or at least helpful, for dual mode operation, where one of the two output circuits 18 and 20 is operated without regulation.

Figure 3:
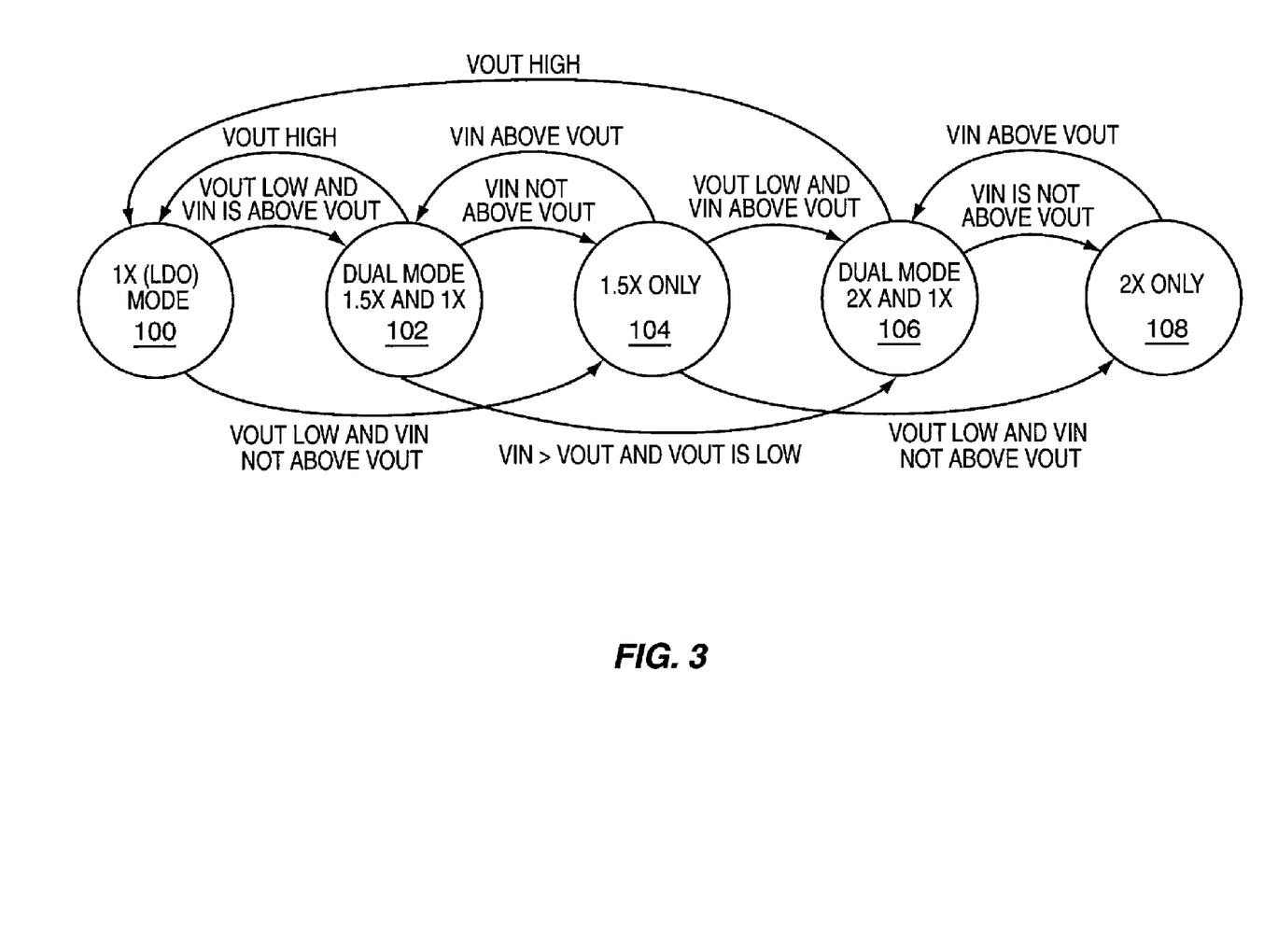
FIG. 3 is a state diagram for one embodiment of dual-mode converter operation as taught herein.

FIG. 3 illustrates one embodiment of state processing logic that may be implemented by the control circuit 22 within the above framework, such as through appropriate programming or configuration of the mode select state machine 30. As non-limiting examples, the mode select state machine 30 may be an FPGA or other programmable circuit element, a microprocessor-based element running software and/or microcoded instructions, or may represent dedicated control logic, such as may be implemented at chip design time.

In any case, one sees that FIG. 3 illustrates a converter embodiment having several single modes, i.e., 1× single mode, 1.5× single mode, and 2× single mode, and two dual modes, i.e., dual 1× and 1.5× mode, and dual 1× and 2× mode. Thus, it should be understood that the teachings herein are not limited to converters having one 1× mode output circuit and one non-1× mode output circuit. For the illustrated state diagram, the converter 10 includes the linear pass output circuit 18 previously illustrated in FIG. 1, and includes an embodiment of the charge pump output circuit 20 which is configurable for 1.5× and 2× operation (respectively indicating 1:1.5 and 1:2 input/output voltage ratios). Alternatively, the charge pump output circuit 20 includes a dedicated 1.5× charge pump circuit and a dedicated 2× charge pump circuit.

In any case, one sees that the mode select state machine 30 operates the converter 10 in state 100 (1× single mode) if VIN>VOUT and if operation in the dual 1×/1.5× mode or dual 1×/2× modes pushes VOUT above the upper bound (i.e., VOUT High). The mode select state machine 30 transitions from state 100 to state 102 (1×/1.5× dual mode) if VOUT falls below the lower bound (VOUT Low) but VIN remains above VOUT.

From state 102, the mode select state machine 30 transitions back to state 100 (1× single mode) if Vout is high, and transitions from state 102 to state 104 (1.5× single mode) if VIN is not above VOUT. Further, from state 102, the mode select state machine 30 transitions to state 106 (1×/2× dual mode) if VIN>VOUT and VOUT is low. In other words, if the 1×/1.5× mode is not sufficient to keep VOUT at the desired voltage but VIN is still high enough to permit continued operation of the 1× circuitry, the mode select state machine 30 moves into the 1×/2× dual mode in an attempt to maintain output voltage regulation without forfeiting the efficiency gains arising from dual mode operation.

The mode select state machine 30 transitions from state 102 to state 104 if VIN falls below VOUT. Further, the mode select state machine 30 transitions from state 102 back to state 100 if VOUT goes high while operating in state 102—i.e., if parallel operation of the 1.5× charge pump with the 1× pass circuit interferes with the ability to maintain VOUT below the upper voltage bound, which may be defined, for example, as the targeted VOUT plus eight percent. (Similarly, the lower voltage bound for triggering the VOUT Low condition may be set at VOUT minus eight percent. Of course, other high/low percentages may be used as needed or desired.)

Continuing, the mode select state machine 30 transitions from state 104 back to state 102 if VIN rises above VOUT by more than the upper bound. Conversely, the mode select state machine 30 transitions from state 104 over to state 106 (1×/2× dual mode) if VOUT falls low while operating in state 104, provided that VIN is above VOUT. From state 106, the mode select state machine 30 transitions back to state 100 if VOUT rises too high. Additionally, the mode select state machine 30 transitions from state 106 to state 108 if VIN falls below VOUT. Similarly, the mode select state machine 30 transitions from state 104 to state 108 if VOUT falls too low and VIN is below VOUT. (The mode select state machine 30 transitions from state 100 to state 104 for the same conditions.) Finally, from state 108, the mode select state machine 30 transitions back to state 106 if VIN rises above VOUT.

Figure 4:
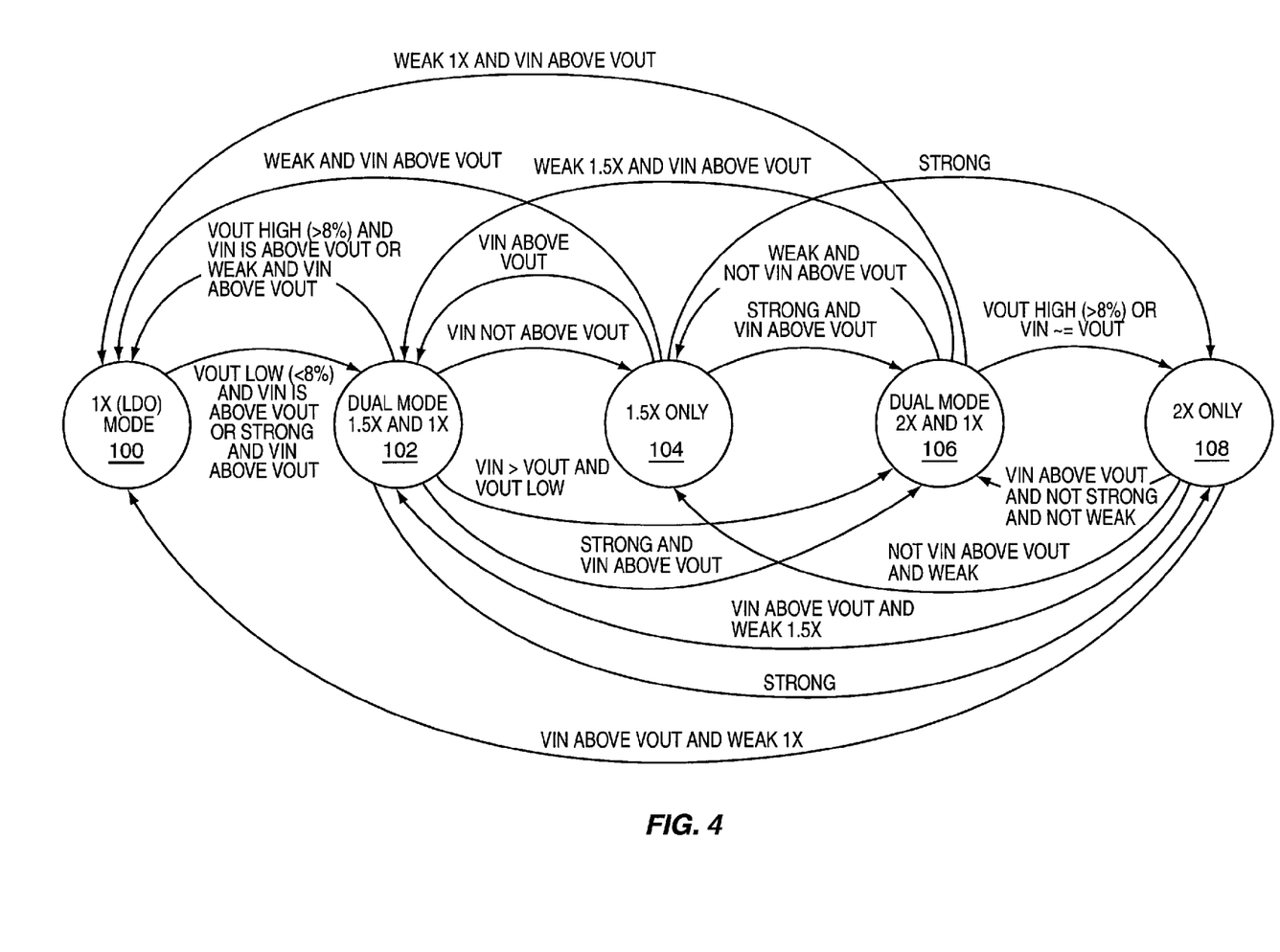
FIG. 4 is a state diagram for another embodiment of dual-mode converter operation as taught herein.

FIG. 4 illustrates the same states 100 (1× single mode), 102 (1×/1.5× dual mode), 104 (1.5× single mode), 106 (1×/2× dual mode), and 108 (2× single mode). However, FIG. 4 includes further state transition control details regarding use of the previously described Weaker and Stronger Mode indicators. For example, as before, the mode select state machine 30 transitions from state 100 to state 102 if VOUT is low and VIN is above VOUT. However, it also makes that transition if the Stronger indicator is active (rather than the Weaker indicator) and VIN is above VOUT. Similar considerations of the Stronger and Weaker indicators are made for other state transitions. For example, the mode select state machine 30 transitions from state 108 back to state 106 for the same conditions explained for FIG. 3, but also if the Stronger indicator is not active and the Weaker indicator is not active.

Of course, techniques similar, but not limited, to those illustrated in FIG. 4 provide improvements to output voltage deviations arising from input voltage and output current transients. Those skilled in the art will also recognize that differing levels or values of time delays applied to making the state transition decisions (e.g., transitions between states 102, 104, etc.) are typically necessary to optimize load regulation, transient response, and noise immunity for a given application. As such, mode decision/transition timing delays may be tuned, programmed, or otherwise configured for a given application of the converter 10, to obtain optimal (or at least balanced) behavior with respect to load regulation, transient response, and noise immunity. Determining, setting, or otherwise adjusting such control delays is specifically contemplated herein.

Figure 5:
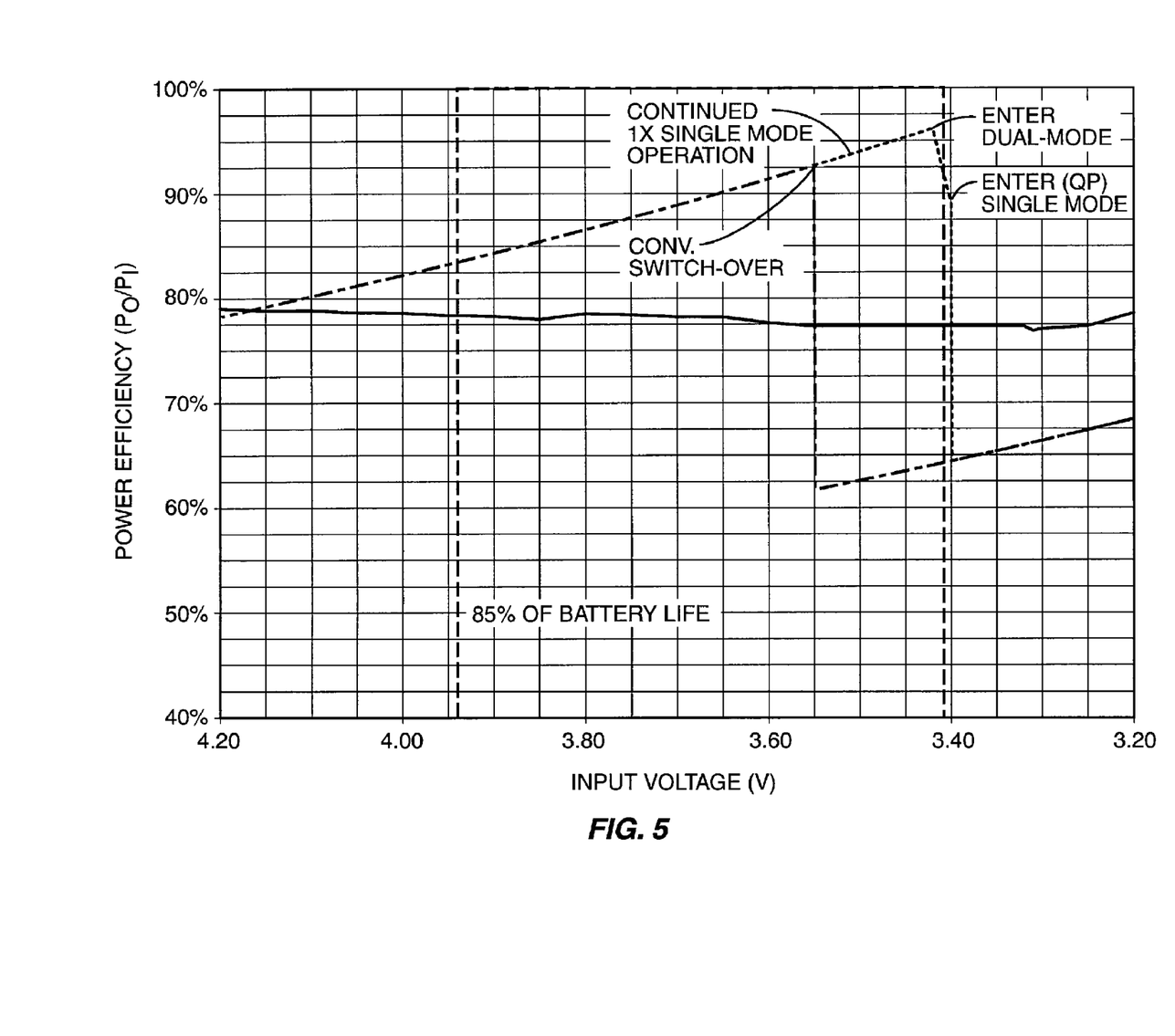
FIG. 5 is a plot of boost configuration power efficiency curves versus input voltage for non-dual mode (conventional) converter operation and for one or more embodiments of dual mode converter operation as taught herein.

Within the above boost-mode framework, FIG. 5 illustrates an example efficiency curve for dual mode converter operation as taught herein, contrasted with an efficiency curve of a "conventional" converter that does not offer dual mode operation. The graph also indicates via dashed lines the "85% battery life box," which illustrates the discharge voltage range for 85% of the battery life of a lithium ion battery, which may be used as an input voltage source for the converter 10. One sees that the dual mode converter 10 taught herein continues operation in the more efficient 1× mode beyond the battery voltage point where the conventional converter switches from 1× mode to the less efficient non-1× mode.

The dual mode converter can remain in the 1× mode longer, given its ability to transition from the 1× mode to the non-1× mode via the dual mode of operation, where its linear pass and charge pump output circuits 18 and 20 operate in parallel to supply the output power. This is in contrast to traditional control methods where a 1×/non-1× converter operates in 1× single mode or non-1× single mode, and the traditional converter's control circuit stays in the stronger non-1× mode to a higher level of input voltage, as compared to the single-mode-to-dual-mode control switchover taught herein, to guarantee that the conventional converter will be able to deliver all of the required output load current after the switch to the weaker 1× mode. One sees the switchover from 1× single mode to 1×/non-1× dual mode at a battery voltage somewhat above 3.4 V, and the subsequent switchover from 1×/non-1× dual mode to non-1× single mode at about 3.4 V. Of course, these switchover values are non-limiting, and depend upon the application requirements, the 1× mode drop-out voltage, etc.

Further, while FIGS. 3-5 relate to boost mode configurations for the non-1× charge pump output circuit 20, it should be understood that similar single/dual mode state control may be used with buck (voltage step-down) configurations with corresponding gains in operating efficiency. For example, in one or more embodiments of the converter 10, the charge pump output circuit 20 comprises a ¾× buck circuit, which nominally provides VOUT as ¾ VIN. In such embodiments, the mode select state machine 30 may operate in a 1× single mode with the linear pass output circuit 18 active and the charge pump output circuit 20 inactive, at least during times when VIN is too low for operation in the ¾× mode, and otherwise operate in a 1×/¾× dual mode or a ¾× single mode.

In other words, the mode select state machine 30 may select the ¾× single mode with the charge pump output circuit 20 active and the linear pass output circuit 18 inactive if detected operating conditions indicate that the charge pump output circuit 20 is more efficient than the linear pass output circuit 18 and can supply all of the output power from the converter 10. As those skilled in the art will appreciate, the efficiency of the linear pass output circuit 18 decreases with increasing input-to-output voltage drop. Thus, the ratio of VIN to the desired VOUT can, in one or more embodiments, be used in the mode selection evaluation. Further, the mode select state machine 30 may select the dual mode of operation (1×/¾× dual mode) for input/output voltage and load current conditions in or around the nominal switchover points between 1× single mode and ¾× single mode operation.

Figure 6:
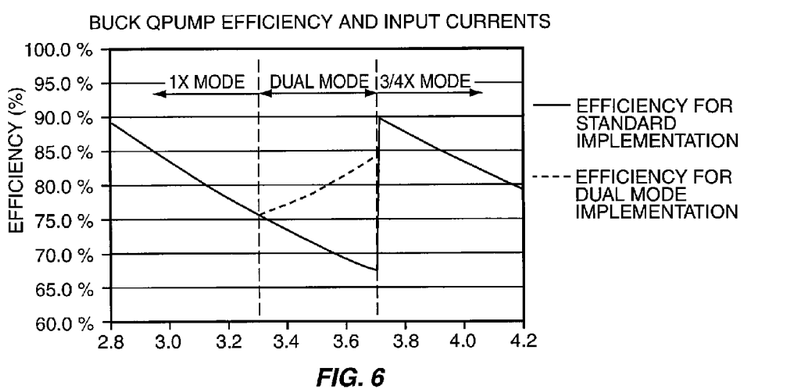
FIG. 6 is a plot of buck configuration power efficiency curves versus input voltage for non-dual mode (conventional) converter operation and for one or more embodiments of dual mode converter operation as taught herein.

With the buck-mode configuration in mind, FIG. 6 illustrates a power efficiency curve versus input voltage for a dual mode converter as taught herein, contrasted with a power efficiency curve versus input voltage for a conventional single mode converter. The efficiency curves are for a desired output voltage of VOUT=2.5V, and a load current IOUT=200 mA, for an embodiment of the converter 10 whose effective output resistance, at least for the charge pump output circuit 20 is approximately 2 Ohms.

The efficiency of the conventional converter with no dual mode operation drops to about 67% when the conventional converter needs to switch from ¾× mode to 1× mode in order to guarantee that it can deliver the 200 mA load current at 2.5V under all conditions. Contrastingly, the efficiency of the illustrated dual mode converter stays up at about 82% under the same conditions, and it does not drop below 75% for the entire input voltage range.

Figure 7:
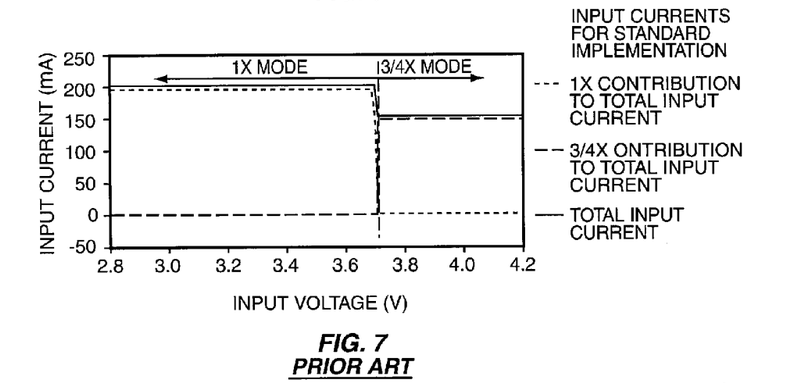
FIG. 7 relates to FIG. 6 and is a plot of single mode current contributions of linear pass and charge pump output circuits for conventional single mode converter operation.
Figure 8:
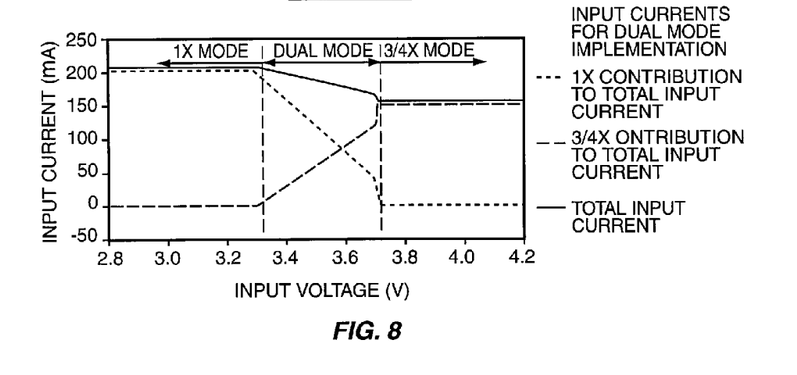
FIG. 8 relates to FIG. 6 and is a plot of single and dual mode current contributions of linear pass and charge pump output circuits for one embodiment of dual mode converter operation as taught herein.

For further comparison, FIG. 7 illustrates input current curves for a conventional converter transitioning from 1× single mode operation to ¾× single mode operation. Correspondingly, FIG. 8 illustrates the current sharing inherent in the dual mode operation where the linear pass output circuit 18 and the charge pump output circuit 20 operate together in parallel in the dual mode. More particularly, FIG. 8 illustrates the current contributions of the linear pass output circuit 18 and the charge pump output circuit 20 as the converter 10 transitions from 1×single mode to 1×/¾× dual mode, and from 1×/¾× dual mode to ¾× single mode.

Those skilled in the art will appreciate that the above curves and the corresponding numeric values are non-limiting examples, and other configurations may be designed or implemented to achieve desired dual mode behavior. More broadly, those skilled in the art will recognize that the present invention is not limited to the foregoing discussion. Rather, dual mode converter implementation and operation as taught herein broadly contemplates dynamically switching between operation in a single mode where one output circuit supplies the output power from the converter, and operating in a dual mode where two or more output circuits operate in parallel, each supplying a portion of the output power.

The latter mode of operation allows the converter logic to keep a more efficient one of the output circuits on longer by activating a less efficient one of the output circuits in parallel. With that configuration, the more efficient output circuit supplies whatever amount of output power it can, given the actual operating conditions. Moreover, by monitoring one or more operating parameters, such as input voltage VIN, output voltage VOUT, etc., the converter can disable dual mode operation responsive to detecting that dual mode is interfering with output voltage regulation, and/or that conditions have changed such that dual mode operation is not possible.

Thus, one advantage of the present invention is that the decision of when to switch modes does not need to take into account the effective output resistance of the converter's output circuits in order to decide whether a more efficient one of the output circuits can be used to supply output current at the desired output voltage. In other words, when the input/output voltage ratio is such that the more efficient output circuit configuration can deliver any amount of positive current to the output, but perhaps not all required load current, that more efficient output circuit can be enabled in parallel in dual mode with a less efficient one of the output circuits. The more efficient output circuit will deliver as much current as it can to the output, and the less efficient configuration will deliver the rest of the needed current. When the output/input voltage ratio is high enough such that the more efficient mode can deliver all of the needed output current at the desired output voltage (i.e., deliver all output power), the regulation of the less efficient output circuit will saturate, providing a convenient indication that the less efficient output circuit should be disabled and that output voltage regulation should be switched over to the more efficient output circuit, which may then be operated in single mode.

An additional advantage of dual mode converter operation as taught herein is that switching over between single modes by transitioning through a dual mode of operation decreases the input voltage ripple and the output voltage ripple, as compared to a conventional transition, which simply shuts down one output circuit and enables another one, with no sustained, overlapping dual operation. More particularly, with conventional mode switchover, the newly enabled one of the output circuits must provide the full output current as soon as it is enabled. If the newly enabled one of the output circuits is a charge pump output circuit, the included charging capacitors typically do not have the correct voltage differential when the new mode is enabled and current from the input and output supplies must be limited in order to reduce voltage and current spikes on these supplies. Limiting those currents typically means that the full load current cannot be supplied immediately from the conventional converter. With the dual mode approach taught herein, virtually all of the needed load current is still delivered by the previously enabled output circuit, so that the output circuit newly enabled for dual mode operation can take some time to reach its steady state operation without needing to deliver significant current immediately to the output load. That "relaxed" condition reduces voltage and current spikes to the input and output supplies.

However, even with dual mode operation, it may be desirable to include some mode switching hysteresis to guard against any mode toggling—although dual mode itself mitigates toggling between different single modes of operation. One consideration in hysteresis implementation may be guided by the recognition that may be desirable to design the dual mode converter 10 such that goes into dual mode more slowly than it exits dual mode.

One possible way to introduce hysteresis in the context of the dual mode converter 10 is to slightly increase the output resistance of the more efficient output circuit 18 or 20 when the less efficient mode is enabled. This behavior may be realized, for example, by connecting some of the charge pump switches between the converter's input and the output during 1×-only mode and regulating them in addition to the main 1× mode linear pass transistor 36 (identified in FIG. 2).

With these and other variations and extensions in mind, those skilled in the art will appreciate that the foregoing description and the accompanying drawings represent non-limiting examples of the methods and apparatus taught herein for dual mode DC-to-DC converters. As such, the present invention is not limited by the foregoing description and accompanying drawings. Instead, the present invention is limited only by the following claims and their legal equivalents.

What is claimed is:

1. A method of operating a DC-to-DC converter that includes a linear pass output circuit and a charge pump output circuit, the method comprising:
   in a first mode of operation, supplying output power via the linear pass output circuit;
   in a second mode of operation, supplying the output power via the charge pump output circuit;
   in a third mode of operation, supplying the output power via the linear pass and charge pump output circuits operating in parallel; and
   dynamically switching between the first, second, and third modes of operation based on one or more detected operating conditions, including selecting the third mode of operation if the one or more detected operating conditions indicate that a more efficient one of the linear pass and charge pump output circuits can supply some but not all of the output power from the DC-to-DC converter.

2. The method of claim 1, wherein dynamically switching between the first, second, and third modes of operation based on one or more detected operating conditions includes selecting one of the first and second modes that corresponds to the more efficient one of the linear pass and charge pump output circuits if the detected operating conditions indicate that the more efficient one can supply all of the output power from the DC-to-DC converter.

3. The method of claim 1, wherein dynamically switching between the first, second, and third modes of operation based on one or more detected operating conditions includes selecting the first mode of operation if the detected operating conditions indicate that the charge pump output circuit cannot supply any of the output power from the DC-to-DC converter, or selecting the second mode of operation if the detected operating conditions indicate that the linear pass output circuit cannot supply any of the output power from the DC-to-DC converter.

4. The method of claim 1, further comprising, while in the third mode of operation, operating a stronger one of the linear pass and charge pump output circuits as a regulated voltage source and operating a weaker one of the linear pass and charge pump output circuits as an unregulated voltage source.

5. The method of claim 4, further comprising exiting the third mode of operation responsive to detecting that operating the linear pass and charge pump output circuits in parallel is interfering with regulating an output voltage of the DC-to-DC converter.

6. The method of claim 4, further comprising exiting the third mode in response to detecting that an input voltage of the DC-to-DC converter is at or below a threshold that prevents one of the linear pass and charge pump output circuits from continuing to supply any output power.

7. The method of claim 1, wherein one of the linear pass and charge pump output circuits is a stronger but less efficient output circuit and the other one is a weaker but more efficient output circuit, and wherein the third mode of operation is selected if detected operating conditions indicate that the weaker but more efficient one of the linear pass and charge pump output circuits can supply some but not all of the output power from the DC-to-DC converter.

8. The method of claim 7, further comprising, while in the third mode of operation, operating the stronger output circuit with voltage regulation and operating the weaker output circuit without voltage regulation.

9. The method of claim 7, further comprising exiting the third mode of operation responsive to detecting that operation in the third mode interferes with regulation of the output voltage of the DC-to-DC converter.

10. The method of claim 7, further comprising exiting the third mode of operation responsive to detecting that an input voltage of the DC-to-DC converter is at or below a threshold for allowing continued operation of the weaker output circuit.

11. A DC-to-DC converter comprising:
a linear pass output circuit;
a charge pump output circuit; and
a control circuit configured to selectively operate the DC-to-DC converter in a first, second, or third mode based on one or more detected operating conditions, wherein in the first mode the linear pass output circuit supplies output power from the DC-to-DC converter, in the second mode the charge pump output circuit supplies the output power, and in the third mode the linear pass and charge pump output circuits operate in parallel to supply the output power; and
wherein the control circuit is configured to select the third mode of operation if the one or more detected operating conditions indicate that a more efficient one of the linear pass and charge pump output circuits can supply some but not all of the output power from the DC-to-DC converter.

12. The DC-to-DC converter of claim 11, wherein the control circuit is configured to select one of the first and second modes that corresponds to the more efficient one of the linear pass and charge pump output circuits if the detected operating conditions indicate that the more efficient one can supply all of the output power from the DC-to-DC converter.

13. The DC-to-DC converter of claim 11, wherein the control circuit is configured to select the first mode of operation if the detected operating conditions indicate that the charge pump output circuit cannot supply any of the output power from the DC-to-DC converter, or to select the second mode of operation if the detected operating conditions indicate that the linear pass output circuit cannot supply any of the output power from the DC-to-DC converter.

14. The DC-to-DC converter of claim 11, wherein the control circuit is configured to, while in the third mode of operation, operate a stronger one of the linear pass and charge pump output circuits as a regulated voltage source and operate a weaker one of the linear pass and charge pump output circuits as an unregulated voltage source.

15. The DC-to-DC converter of claim 14, wherein the control circuit is-configured to exit the third mode of operation responsive to detecting that operating the linear pass and charge pump output circuits in parallel is interfering with regulating an output voltage of the DC-to-DC converter.

16. The DC-to-DC converter of claim 14, wherein the control circuit is configured to exit the third mode in response to detecting that an input voltage of the DC-to-DC converter is at or below a threshold that prevents one of the linear pass and charge pump output circuits from continuing to supply any of the output power.

17. The DC-to-DC converter of claim 11, wherein one of the linear pass and charge pump output circuits is a stronger but less efficient output circuit and the other one is a weaker but more efficient output circuit, and wherein the control circuit is configured to select the third mode of operation if detected operating conditions indicate that the weaker but more efficient one of the linear pass and charge pump output circuits can supply some but not all of the output power from the DC-to-DC converter.

18. The DC-to-DC converter of claim 17, wherein the control circuit is configured to, while in the third mode of operation, operate the stronger output circuit with voltage regulation and operate the weaker output circuit without voltage regulation.

19. The DC-to-DC converter of claim 18, wherein the control circuit is configured to exit the third mode of operation responsive to detecting that operation in the third mode interferes with regulation of the output voltage of the DC-to-DC converter.

20. The DC-to-DC converter of claim 18, wherein the control circuit is configured to exit the third mode of operation responsive to detecting that an input voltage of the DC-to-DC converter is at or below a threshold for allowing continued operation of the weaker output circuit.

* * * * *